US012694214B2

(12) United States Patent
Takeoka

(10) Patent No.: US 12,694,214 B2
(45) Date of Patent: Jul. 28, 2026

(54) LEARNING SYSTEM, LEARNING METHOD, AND RECORDING MEDIUM

(71) Applicant: NEC Corporation, Tokyo (JP)

(72) Inventor: Kunihiro Takeoka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 261 days.

(21) Appl. No.: 18/370,933

(22) Filed: Sep. 21, 2023

(65) Prior Publication Data

US 2024/0104433 A1 Mar. 28, 2024

(30) Foreign Application Priority Data

Sep. 27, 2022 (JP) ................................. 2022-153949

(51) Int. Cl.
  G06F 40/289 (2020.01)
  G06N 20/00 (2019.01)
(52) U.S. Cl.
  CPC ........... G06F 40/289 (2020.01); G06N 20/00 (2019.01)
(58) Field of Classification Search
  None
  See application file for complete search history.

(56) References Cited

U.S. PATENT DOCUMENTS 11,030,394 B1 6/2021 Kozareva et al.
2021/0182490 A1* 6/2021 Guo ...................... G06F 40/284

2021/0232948 A1 7/2021 Otsuka et al.
2022/0004712 A1 1/2022 Bahuleyan et al.
2023/0259708 A1* 8/2023 Pouran Ben Veyseh .....................
  G06F 40/30
  704/232

FOREIGN PATENT DOCUMENTS

JP 2019-021218 A 2/2019
JP 2019-215841 A 12/2019

OTHER PUBLICATIONS

Pang et al., An Approach to Generate Topic Similar Document by Seed Extraction-based SeqGAN Training for Bait Document, 2018, IEEE, 978-1-5386-4210-8/18, pp. 803-810 (Year: 2018).*
Rui Meng, Sanqiang Zhao, Shunguang Han, Daqing He, Peter Brusilovsky, and Yu Chi, "Deep Keyphrase Generation", ACL 2017, pp. 582-592.
Xianjie Shen, Yinghan Wang, Rui Meng, and Jingbo Shang, "Unsupervised Deep Keyphrase Generation", AAAI 2022, pp. 11303-11311.
Radford, A. et al., "Language Models are Unsupervised Multitask Learners", pp. 1-24, <https://d4muofpksywv.cloudfront.net/better-language-models/language_models_are_unsupervised_multitask_learners.pdf>.

(Continued)

*Primary Examiner* — Antim G Shah
(74) *Attorney, Agent, or Firm* — Sughrue Mion, PLLC

(57) ABSTRACT

A learning system includes: an acquisition unit that obtains document data; a generation unit that generates a key phrase from the document data; a restoration unit that restores the document data from the generated key phrase; and a learning unit that learns parameters of the generation unit on the basis of the document data and the restored document data. According to such a learning system, high-precision learning can be performed even when there is no key phrase as a correct answer.

8 Claims, 9 Drawing Sheets

DOCUMENT: Because relational data represented in tables are not connected with a knowledge base, efficient usage of tables such as semantic search in the web requires the determination of column concepts, that is, annotating a column with an entity in the knowledge base.

KEY PHRASE: KNOWLEDGE BASE, TABLE SEARCH, SEARCH

TAKEOKA ET AL., DETERMINATION OF COLUMN CONCEPTS IN TABLES USING MULTI-LABEL CLASSIFICATION AND KNOWLEDGE BASE EMBEDDINGS The 32nd ANNUAL CONFERENCE OF THE JAPANESE SOCIETY FOR ARTIFICIAL INTELLIGENCE, 2018

(56) References Cited

OTHER PUBLICATIONS

Brown, T. B. et al., 2020. Language Models are Few-Shot Learners. In Proceedings of Advances in Neural Information Processing Systems 33: Annual Conference on Neural Information Processing Systems 2020, NeurIPS 2020, Dec. 6-12, 2020, virtual, pp. 1-25.

Hou Pong Chan et al., "Neural Keyphrase Generation via Reinforcement Learning with Adaptive Rewards", ACL 2019, pp. 2163-2174 <https://aclanthology.org/P19-1208/>.

Japanese Office Action for JP Application No. 2022-153949, mailed on May 26, 2026 with English Translation.

* cited by examiner

1: LEARNING SYSTEM

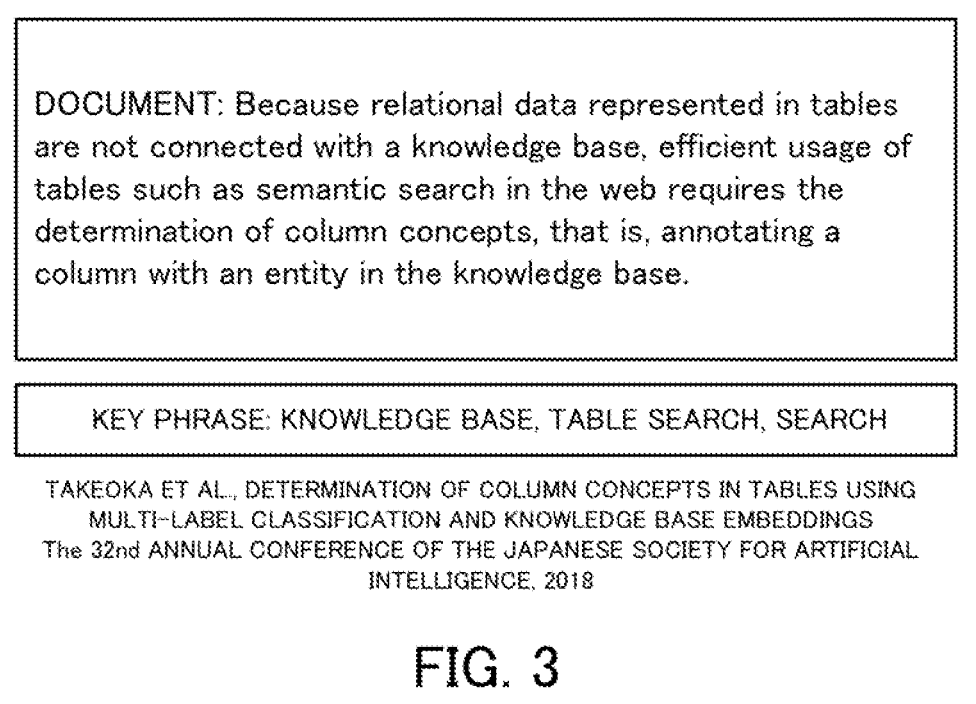

DOCUMENT: Because relational data represented in tables are not connected with a knowledge base, efficient usage of tables such as semantic search in the web requires the determination of column concepts, that is, annotating a column with an entity in the knowledge base.

KEY PHRASE: KNOWLEDGE BASE, TABLE SEARCH, SEARCH

TAKEOKA ET AL., DETERMINATION OF COLUMN CONCEPTS IN TABLES USING
MULTI-LABEL CLASSIFICATION AND KNOWLEDGE BASE EMBEDDINGS
The 32nd ANNUAL CONFERENCE OF THE JAPANESE SOCIETY FOR ARTIFICIAL
INTELLIGENCE, 2018

FIG. 3

LEARNING SYSTEM, LEARNING METHOD, AND RECORDING MEDIUM

INCORPORATION BY REFERENCE

This application is based upon and claims the benefit of priority from Japanese Patent Application No. 2022-153949, filed on Sep. 27, 2022, the disclosure of which is incorporated herein in its entirety by reference.

TECHNICAL FIELD

Example embodiments of this disclosure relate to technical fields of a learning system, a learning method, and a recording medium that learn a key phrase generator.

BACKGROUND ART

A large volume of document data are published on the web, and a demand for advanced search and recommendation of the document data is also increasing at the same time. What is useful for the search and recommendation of the document data, is a key phrase added to the document data. Non-Patent Literature 1 discloses a technique/technology of learning a model for generating a key phrase, by using pair data including a large amount of documents and corresponding key phrases.

Non-Patent Literature 2 discloses a technique/technology using an automatically generated pseudo key phrase, instead of using the pair data including the document and the key phrase prepared by a human being, when the model proposed in Non-Patent Literature 1 is learned.

PRIOR ART DOCUMENTS

Non-Patent Literature

[Non-Patent Literature 1] Rui Meng, Sanqiang Zhao, Shun-guang Han, Daqing He, Peter Brusilovsky, and Yu Chi, "Deep Keyphrase Generation", ACL 2017.
[Non-Patent Literature 2] Xianjie Shen, Yinghan Wang, Rui Meng, and Jingbo Shang, "Unsupervised Deep Keyphrase Generation", AAAI 2022.

In the model learned by the learning method described in Non-Patent Literature 1, accuracy for the key phrase increases, but the model requires correctly annotated key phrases. On the other hand, in the learning method described in Non-Patent Literature 2, the accuracy is low in many cases.

SUMMARY

It is an example object of this disclosure to provide a learning apparatus, a learning method, and a learning program for building a model that accurately generates a key phrase even in a situation where there is no annotated key phrase.

A learning system according to an example aspect of this disclosure includes: an acquisition unit that obtains document data; a generation unit that generates a key phrase from the document data; a restoration unit that restores the document data from the generated key phrase; and a learning unit that learns parameters of the generation unit on the basis of the document data and the restored document data.

A learning method according to an example aspect of this disclosure includes: obtaining document data; generating a key phrase from the document data by using a generation unit; restoring the document data from the generated key phrase; and learning parameters of the generation unit on the basis of the document data and the restored document data.

A recording medium according to an example aspect of this disclosure is a non-transitory recording medium on which a computer program that allows at least one computer to execute a learning method is recorded, the learning method including: obtaining document data; generating a key phrase from the document data by using a generation unit; restoring the document data from the generated key phrase; and learning parameters of the generation unit on the basis of the document data and the restored document data.

BRIEF DESCRIPTION OF THE DRAWINGS

FIG. 3 is an explanatory diagram illustrating an example of a document and corresponding key phrases;

EXAMPLE EMBODIMENTS

Hereinafter, a learning system, a learning method, and a recording medium according to example embodiments will be described with reference to the drawings.

First Example Embodiment

A learning system according to a first example embodiment will be described with reference to FIG. 1 to FIG. 4.

(Hardware Configuration)

Figure 1:
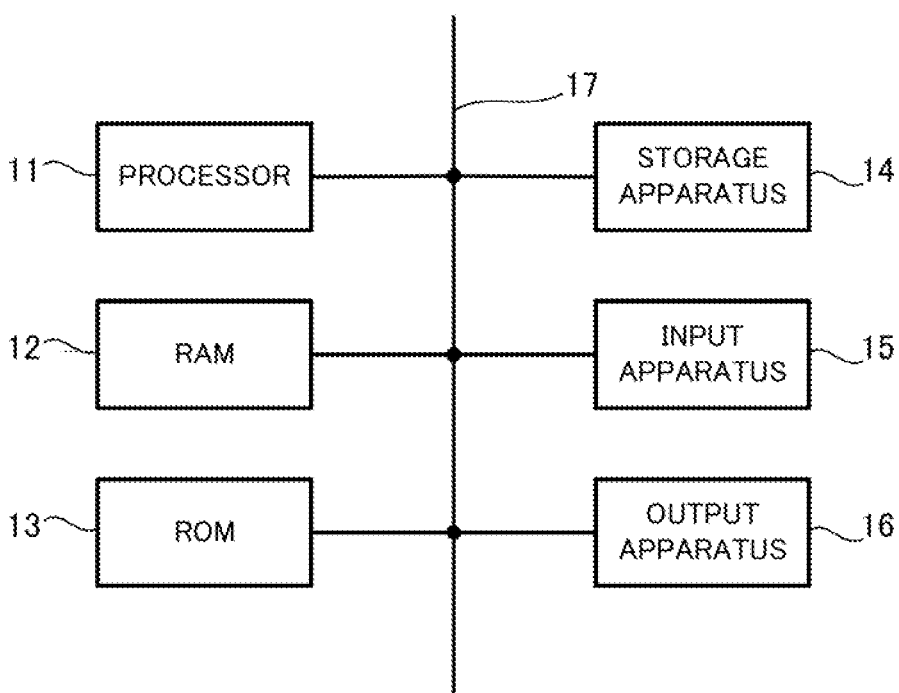
FIG. 1 is a block diagram illustrating a hardware configuration of a learning system according to a first example embodiment.

First, a hardware configuration of the learning system according to the first example embodiment will be described with reference to FIG. 1. FIG. 1 is a block diagram illustrating the hardware configuration of the learning system according to the first example embodiment.

As illustrated in FIG. 1, a learning system 1 according to the first example embodiment includes a processor 11, a RAM (Random Access Memory) 12, a ROM (Read Only Memory) 13, and a storage apparatus 14. The learning system 1 may further include an input apparatus 15 and an output apparatus 16. The processor 11, the RAM 12, the ROM 13, the storage apparatus 14, the input apparatus 15, and the output apparatus 16 are connected through a data bus 17.

The processor 11 reads a computer program. For example, the processor 11 is configured to read a computer program stored by at least one of the RAM 12, the ROM 13 and the storage apparatus 14. Alternatively, the processor 11 may read a computer program stored in a computer-readable recording medium, by using a not-illustrated recording medium reading apparatus. The processor 11 may obtain (i.e., may read) a computer program from a not-illustrated apparatus disposed outside the learning system 1, through a network interface. The processor 11 controls the RAM 12, the storage apparatus 14, the input apparatus 15, and the output apparatus 16 by executing the read computer program. Especially in this example embodiment, when the processor 11 executes the read computer program, a function block for learning a generation unit (described later in detail) that generates a key phrase is realized or implemented in the processor 11. That is, the processor 11 may function as a controller for performing each control when the generation unit is learned.

The processor 11 may be configured as a CPU (Central Processing Unit), a GPU (Graphics Processing Unit), a FPGA (field-programmable gate array), a DSP (Demand-Side Platform), an ASIC (Application Specific Integrated Circuit), or a quantum processor, for example. The processor 11 may include one of them, or may use a plurality of them in parallel.

The RAM 12 temporarily stores the computer program to be executed by the processor 11. The RAM 12 temporarily stores the data that is temporarily used by the processor 11 when the processor 11 executes the computer program. The RAM 12 may be, for example, a D-RAM (Dynamic Random Access Memory) or a SRAM (Static Random Access Memory). Another type of volatile memory may also be used instead of the RAM 12.

The ROM 13 stores the computer program to be executed by the processor 11. The ROM 13 may otherwise store fixed data. The ROM 13 may be, for example, a P-ROM (Programmable Read Only Memory) or an EPROM (Erasable Read Only Memory). Another type of non-volatile memory may also be used instead of the ROM 13.

The storage apparatus 14 stores the data that is stored for a long term by the learning system 1. The storage apparatus 14 may operate as a temporary storage apparatus of the processor 11. The storage apparatus 14 may include, for example, at least one of a hard disk apparatus, a magneto-optical disk apparatus, a SSD (Solid State Drive), and a disk array apparatus.

The input apparatus 15 is an apparatus that receives an input instruction from a user of the learning system 1. The input apparatus 15 may include, for example, at least one of a keyboard, a mouse, and a touch panel. The input apparatus 15 may be configured as a portable terminal, such as a smartphone and a tablet. The input apparatus 15 may be an apparatus that allows an audio input including a microphone, for example.

The output apparatus 16 is an apparatus that outputs information about the learning system 1 to the outside. For example, the output apparatus 16 may be a display apparatus (e.g., a display) that is configured to display the information about the learning system 1. Furthermore, the output apparatus 16 may be a speaker that audio-outputs the information about the learning system 1, or the like. The output apparatus 16 may be configured as a portable terminal, such as a smartphone and a tablet. The output apparatus 16 may be an apparatus that outputs the information in a format other than an image. For example, the output apparatus 16 may be a speaker that audio-outputs the information about the learning system 1.

Although FIG. 1 illustrates the learning system 1 including the plurality of apparatuses, all or a part of the functions may be realized or implemented as a single apparatus (i.e., the learning apparatus). In that instance, the learning apparatus may include only the processor 11, the RAM 12, and the ROM 13, and the other components (i.e., the storage apparatus 14, the input apparatus 15, and the output apparatus 16) may be provided for an external apparatus connected to the learning apparatus. In addition, in the learning system, a partial arithmetic function may be realized or implemented by an external apparatus (e.g., external servers, cloud, etc.).

(Functional Configuration)

Figure 2:
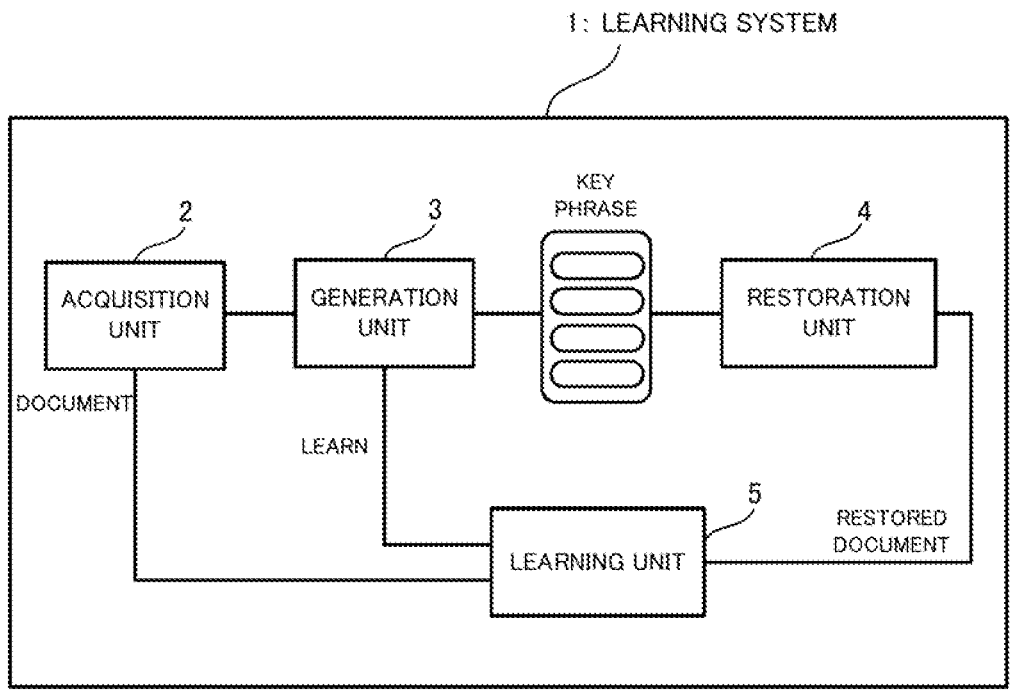
FIG. 2 is a block diagram illustrating a functional configuration of a learning system according to the first example embodiment.

Next, a functional configuration of the learning system 1 according to the first example embodiment will be described with reference to FIG. 2. FIG. 2 is a block diagram illustrating the functional configuration of the learning system according to the first example embodiment.

As illustrated in FIG. 2, the learning system 1 according to the first example embodiment includes, as components for realizing the functions thereof, an acquisition unit 2, a generation unit 3, a restoration unit 4, and a learning unit 5. Each of the acquisition unit 2, the generation unit 3, the restoration unit 4, and the learning unit 5 may be a processing block that is realized or implemented by the processor 11 (see FIG. 1), for example.

The acquisition unit 2 is configured to obtain document data for learning the generation unit 3. The document data obtained by the acquisition unit 2 is configured to be outputted to each of the generation unit 3 and the learning unit 5. The document data are data including a document set, for example. The document set is a set of multiple documents. Each document includes one or more sentences. The key phrase is not added to the document when the document is obtained by the acquisition unit 2. Although the document data in this example embodiment may be divided into structures, such as a title and a text/body thereof, they shall be collectively referred to as the document data, and shall include one text, a structured document, or the like. The document used for the learning is preferably a document in the same field as, or in a similar field to, a field in which the generation unit 3 to learn is used.

The acquisition unit 2 may be further configured to obtain a language model. The language model here is used to perform the learning in the learning unit 5 described later.

The generation unit 3 is configured as a key phrase generator that generates one or more key phrases from the inputted document. The generation unit 3 is configured as a model that outputs the key phrases, by inputting the document, for example. The generation unit 3 may output the generated key phrases, as a set of key phrases or a string of key phrases. The key phrases outputted by the generation unit 3 are configured to be outputted to the restoration unit 4. The language model may also be used for an element that constitutes the generation unit 3.

The language model is a model that outputs its probability or likelihood for an inputted word string. For example, the probability that is outputted when a word string "his age is 100" is inputted into a certain language model, is higher than the probability that is outputted when a word string "his birthday is 100" is inputted. This is because this language model retains the probability that a relation between "he" and "100" is "age" and the probability that the relation is "birthday", and the probability that the relation is "age" is higher than the other. Similarly, under the condition that a character string is given, the language model is configured to determine whether a string following the given character string is valid/appropriate. That is, the language model is also allowed to output the probability that a particular word string is generated by the language model, under the condition that the word string is given. As an example of the language model, for example, a language model generated by Reference 1 or 2 below may be applied.

> [Reference 1]: Radford, A. et al., 2018. Language Models are Unsupervised Multitask Learners. Technical Report. https://d4mucfpksywv.cloudfront.net/better-language-models/language_models_are_unsupervised_ multitask_learners.pdf > [Reference 2]: Brown, T. B. et al., 2020. Language Models are Few-Shot Learners. In Proceedings of Advances in Neural Information Processing Systems 33: Annual Conference on Neural Information Processing Systems 2020, NeurIPS 2020, Dec. 6-12, 2020, virtual.

The key phrase is a phrase including one or more words, and especially refers to a phrase that represents a major topic of a target document, of the phrases that represent one concept. For example, a phrase "Natural Language processing" represents a concept of a technique/technology of performing statistical and mathematical processing on natural languages that are normally used by humans for conversation and writing. It is common that a plurality of key phrases are added to one document, and the key phrases have a function of characterizing or summarizing the document. For example, the key phrases of Non-Patent Literature 1 described above may be "natural language processing" or "summary" or the like. Specific examples of the document and the corresponding key phrases include those illustrated in FIG. 3. The key phrase may be a character string included in the document data, and may be a character, a word, a plurality of words, a sentence, or a plurality of sentences.

The restoration unit 4 is configured as a text restorer that restores the document from the key phrases generated by the generation unit 3. The restoration unit 4 is configured as a model that outputs the document by inputting the key phrases, for example. The restoration unit 4 may generate one or more documents from a single key phrase, or may generate one or more documents from a plurality of key phrases. The document restored by the restoration unit 4 is configured to be outputted to the learning unit 5. As in the generation unit 3, the language model may be used for an element that constitutes the restoration unit 4.

The learning unit 5 is configured to learn the generation unit 3, on the basis of the document obtained by the acquisition unit 2 (i.e., the document used for generating the key phrases), and the document restored by the restoration unit 4 (i.e., the document restored from the key phrases). Specific content of the learning by the learning unit 5 will be described in detail in another example embodiment described later.

In addition to the above-described components, the learning system 1 according to the first example embodiment may include a storage unit or an output unit. In that case, the storage unit may be configured to store the document data without a key phrase string that is a correct answer (i.e., the document data obtained by the acquisition unit 2, or the document data obtained by the acquisition unit 2), parameters of the generation unit 3, the language model for evaluation used in the learning unit 5, the key phrases generated by the generation unit 3, and an evaluation value calculated in the learning unit 5, and the like. The output unit may be configured to output the parameters of the generation unit 3 that are learned.

(Flow of Learning Operation)

Figure 4:
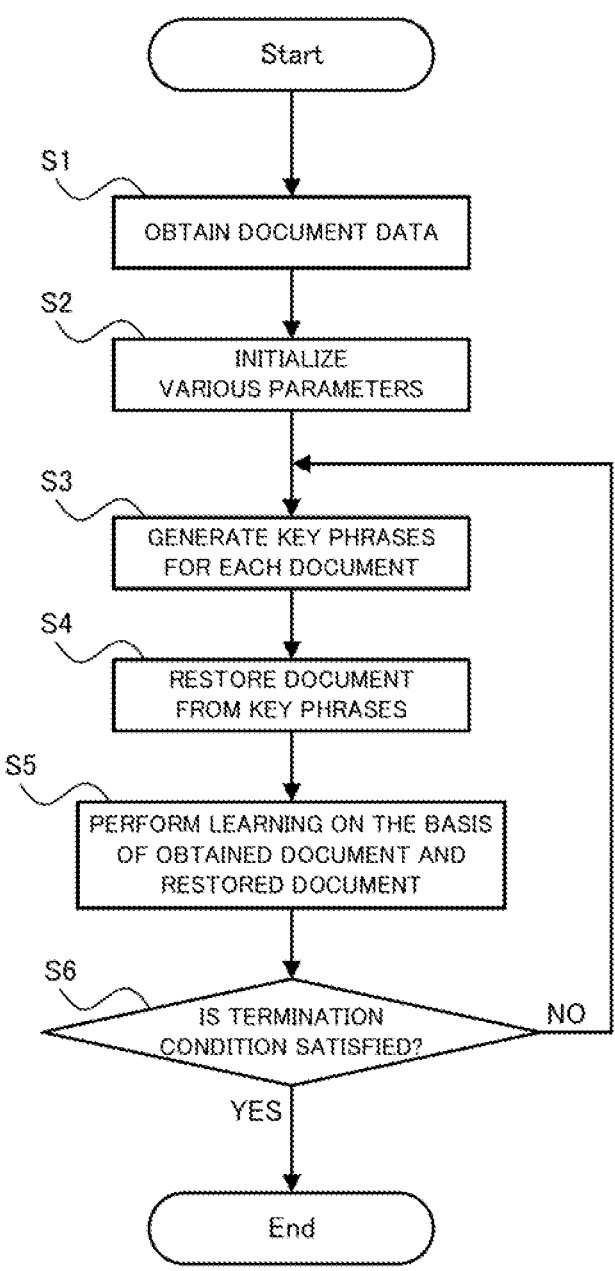
FIG. 4 is a flowchart illustrating a flow of operation of the learning system according to the first example embodiment.

Next, a flow of a learning operation (i.e., an operation when the generation unit 3 is learned) by the learning system 1 according to the first example embodiment will be described in detail with reference to FIG. 4. FIG. 4 is a flowchart illustrating the flow of the operation of the learning system according to the first example embodiment.

As illustrated in FIG. 4, when the learning operation is started by the learning system 1 according to the first example embodiment, first, the acquisition unit 2 obtains the document data (step S1). That is, the acquisition unit 2 obtains the document set as an information source for learning the generation unit 3. For example, the acquisition unit 2 may obtain the document set stored in advance in the storage apparatus 14 or the like, or may obtain the document set from another apparatus that is connected through a network.

Subsequently, the learning system 1 initializes the parameters related to the key phrase generation of the generation unit 3 and the parameters related to the learning of the learning unit 5 (step S2). Values of the parameters may be obtained together with the document set in the step S1, or may be set in advance, or may be random number values. For example, the learning system 1 may perform initialization with reference to the parameters stored in the storage apparatus 14, or may perform initialization with reference to the parameters of another generation unit and another learning unit that are connected through a network.

Subsequently, the generation unit 3 generates the corresponding key phrases for each document of the inputted document data (step S3). For example, the generation unit 3 may generate the key phrases with reference to the parameters related to the key phrase generation stored in the storage apparatus 14 or the like, or may generate the key phrases with reference to the parameters of another generation unit that is connected through a network.

Subsequently, the restoration unit 4 restores the document (i.e., the document used to generate the key phrases), from the key phrases generated by the generation unit 3 (step S4). Then, the learning unit 5 learns the parameters related to the key phrase generation of the generation unit 3, on the basis of the document obtained by the acquisition unit 2 and the document restored by the restoration unit 4 (step S5).

Subsequently, the learning unit 5 determines whether or not a predetermined termination condition is satisfied (step S6). For example, the learning unit 5 determines whether or not the termination condition is satisfied, on the basis of a change rate of the parameters updated in the learning, an absolute value of the evaluation value, a parameter that is a threshold for the number of updating times, or the like. For example, when the number of updating times is determined to be 1000, the learning unit 5 determines to end when the number of updating times exceeds 1000. Furthermore, when a change amount of the updated parameters is less than a value set in the step S2 (i.e., in the initialization of the parameters), the updating may be ended.

When it is determined in the learning unit 5 that the termination condition is satisfied (step S6: YES), a series of learning operation steps is ended. Here, the parameters of the learned generation unit 3 may be outputted. At that time, the key phrases corresponding to each document of the document data generated by the learning unit 5 may be also outputted simultaneously. When it is determined in the learning unit 5 that the termination condition is not satisfied (step S6: NO), the processing steps after the step S3 are repeatedly performed.

(Technical Effect)

Next, a technical effect obtained by the learning system 1 according to the first example embodiment will be described.

As described in FIG. 1 to FIG. 4, in the learning system 1 according to the first example embodiment, the key phrases are generated from the document data, and the original document is restored from the generated key phrases. Then, the parameters of the generation unit 3 are learned on the basis of the obtained document and the restored document. In this way, the key phrase as the correct answer is not required, and it is thus possible to learn the generation unit 3 without using a manually added key phrase corresponding to a document referred to as training data. Furthermore, by utilizing such characteristics that the generated key phrases summarize the document by using the language model for the set of the generated key phrase and the document in the learning, it is possible to automatically perform the evaluation even in a situation where the key phrase as the correct answer is not given. Therefore, it is possible to learn the generation unit 3 that generates a useful key phrase.

For example, in the methods described in Non-Patent Literatures 1 and 2, it is assumed that there are the pair data including the document and the key phrase as the correct answer, when the generation unit 3 is learned, and the learning without the key phrase as the correct answer is not considered. Furthermore, although there is a solution to the above problems in the Non-Patent Literature 2, it is hardly possible to perform the learning with high accuracy. In this example embodiment, however, the key phrases that are the summary of the given document are generated in accordance with the given document, and the learning is performed on the basis of the document restored from the key phrases, and it is thus possible to perform the learning of the generation unit 3 with higher accuracy than that in the above-described methods.

Second Example Embodiment

The learning system 1 according to a second example embodiment will be described with reference to FIG. 5. The second example embodiment indicates a specific example of the learning operation in the first example embodiment, and may be the same as the first example embodiment in the other parts. For this reason, a part that is different from the first example embodiment will be described in detail below, and a description of other overlapping parts will be omitted as appropriate.

(Flow of Learning Operation)

First, with reference to FIG. 5, the operation of the learning unit 5 in the learning system 1 according to the second example embodiment (specifically, the operation in the S5 in FIG. 4) will be described in detail. FIG. 5 is a flowchart illustrating the operation of the learning unit in the learning system according to the second example embodiment.

Figure 5:
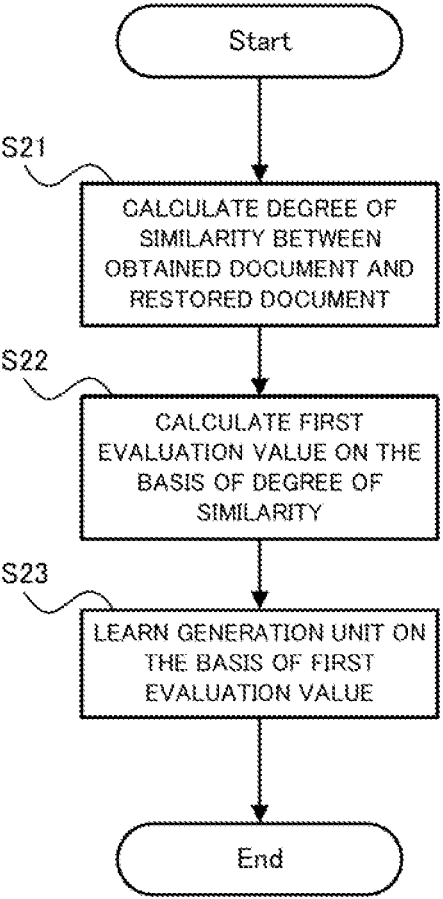
FIG. 5 is a flowchart illustrating operation of a learning unit in a learning system according to a second example embodiment.

As illustrated in FIG. 5, first, the learning unit 5 according to the second example embodiment calculates a degree of similarity between the document obtained by the acquisition unit 2 and the document restored by the restoration unit 4 (step S21). A method of calculating the degree of similarity is not particularly limited. For example, the learning unit 5 may calculate a cosine similarity degree of each document. The learning unit 5 may calculate the degree of similarity, by using the language model obtained by the acquisition unit 2 (the language model subjected to previous learning).

Subsequently, the learning unit 5 calculates a first evaluation value on the basis of the calculated degree of similarity (step S22). The first evaluation value may be a value indicating a degree of restoration of the original document data (i.e., the document data used to generate the key phrases) from the key phrases. The first evaluation value may be calculated by using a predetermined evaluation function, for example. The first evaluation value may be a value that is a weighted sum of a plurality of evaluation functions, or the like. At least one of the evaluation functions may include an evaluation function using the language model. A specific example of the evaluation function, or the like will be described in detail later.

Subsequently, the learning unit 5 learns the generation unit 3 on the basis of the calculated first evaluation value. For example, the learning unit 5 may update the parameters of the generation unit 3 to maximize the evaluation value calculated in the step S22. Alternatively, the learning unit 5 may update the parameters of the generation unit 3 to minimize a loss function calculated as the first evaluation value.

(Specific Learning Example)

Next, a specific learning example (i.e., a learning example using the first evaluation value) in the learning system according to the second example embodiment will be described.

As described above, the learning unit 5 in the learning system according to the second example embodiment calculates the first evaluation value for each of the key phrases generated for each document. The first evaluation value is a value for evaluating a degree of restoration of the document used by the generation unit 3 to generate the key phrases, and is calculated by using the evaluation function. For example, when the document is x and the generated key phrase is y, an evaluation function v may be obtained by the calculation of the following equation (A).

[Equation 1]

$$v(x, y) = \sum_{x_i \in x} \log P_{LM}(x_i \mid x_{<i}, y) \tag{A}$$

In the equation (A), $P_{LM}$ is the probability that an i-th word $x_i$ is generated under the condition that the key phrase y and the first to i-th words are given by the language model that is subjected to previous learning. The sum of these values makes it possible to evaluate how easily the document is generated, under the condition that the key phrase y is given. It is not always necessary to use the entire document when calculating the first evaluation value, and it is possible to make a change, such as using only 200 words from the beginning of the document, for example.

The learning unit 5 updates the parameters of the generation unit 3 on the basis of the calculated first evaluation value. For example, it can be updated by the following scheme. When the parameter of the generation unit 3 is θ and the evaluation function is v, and when the evaluation function v is continuous and differentiable with respect to the parameter, it is possible to express an updated equation by the following equation (B).

[Equation 2]

$$\theta' = \theta + \gamma \frac{\partial v}{\partial \theta} \qquad (B)$$

where $\gamma$ is a parameter representing an update rate.

In addition, when the evaluation function v is discontinuous or non-differentiable, the parameter $\theta$ is updated by using a framework of reinforcement learning or the like. As in a method described in Reference 3, the followings are considered: the key phrase generation is a string of actions in an environment where the document is given; the key phrases are generated in order and the generated words are also included in a status; and the first evaluation value is regarded as a reward for an action. Then, a parameter update equation in the following equation (C) can be obtained by a method using a policy gradient.

[Equation 3]

$$\nabla\theta J(\theta) = E\pi[\nabla\theta \log \pi\theta(yt|st;\theta)\{Q\pi(st,yt)\}] \qquad (C)$$

Here, $E\pi$ is a symbol/sign representing an expectation value for the policy $\pi$. $\pi\theta(yt|st;\theta)$ is the probability of generation of a key phrase word yt that is generated in a status st. $Q\pi(st,yt)$ represents an expectation value of a reward obtained until an action yt in the status st, and $J(\theta)$ represents a target function to optimized. $\nabla\theta J(\theta)$ expresses a differential value of the parameter $\theta$ of the function J. From this result, the parameter $\theta$ can be updated.

[Reference 3]: Hou Pong Chan et al., Neural Keyphrase Generation via Reinforcement Learning with Adaptive Rewards, ACL 2019. https://aclanthology.org/P19-1208/

(Technical Effect)

Next, a technical effect obtained by the learning system 1 according to the second example embodiment will be described.

As described in FIG. 5, in the learning system 1 according to the second example embodiment, the first evaluation value is calculated from the degree of similarity between the obtained document and the restored document, and the parameters of the generation unit 3 are learned on the basis of the calculated first evaluation value. In this way, as in the first example embodiment, it is possible to properly learn the generation unit 3 by using the document data that do not include the key phrase as the correct answer.

Third Example Embodiment

The learning system 1 according to a third example embodiment will be described with reference to FIG. 6. The third example embodiment is partially different from the first and second example embodiments only in the configuration and operation, and may be the same as the first and second example embodiments in the other parts. For this reason, a part that is different from each of the example embodiments described above will be described in detail below, and a description of other overlapping parts will be omitted as appropriate.

(Functional Configuration and Learning Operation)

First, a functional configuration and a learning operation of the learning system 1 according to the third example embodiment will be described with reference to FIG. 6. FIG. 6 is a block diagram illustrating the functional configuration of the learning system according to the third example embodiment.

Figure 6:
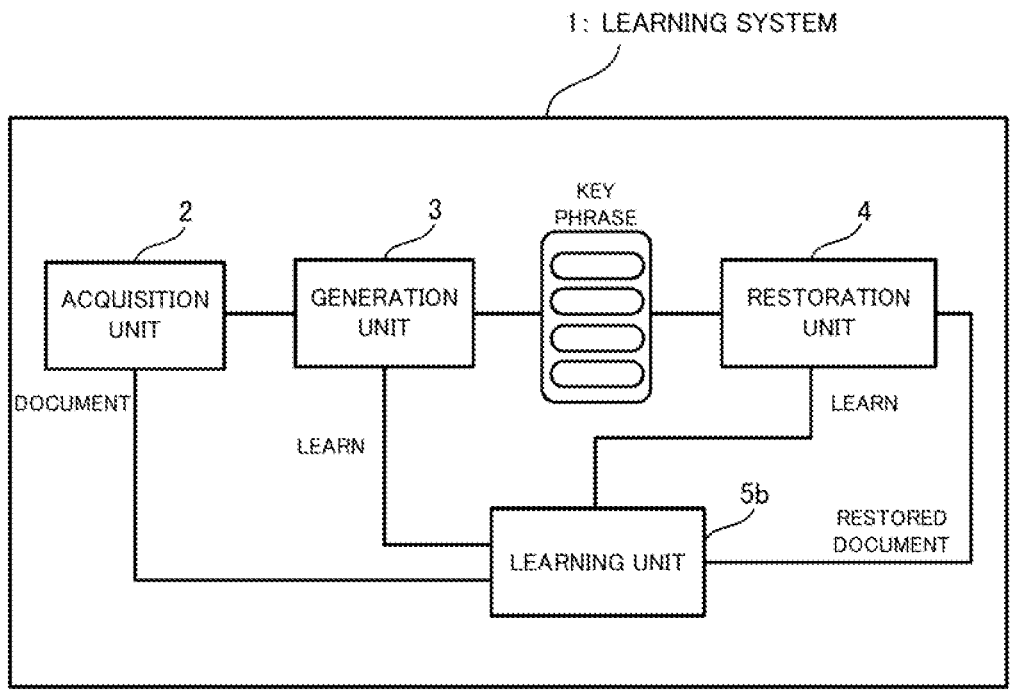
FIG. 6 is a block diagram illustrating a functional configuration of a learning system according to a third example embodiment.

As illustrated in FIG. 6, the learning system 1 according to the third example embodiment includes, as components for realizing the functions thereof, the acquisition unit 2, the generation unit 3, the restoration unit 4, and a learning unit 5b. That is, the third example embodiment is generally the same as the first example embodiment in the components of the learning system 1, but is partially different in the configuration and operation of the learning unit 5b.

The learning unit 5b according to the third example embodiment is configured to learn the parameters of the restoration unit 4, in addition to the parameters of the generation unit 3. A method of learning the restoration unit 4 may be the same as the learning method of the generation part 3 already described. Specifically, the learning unit 5b may learn the parameters of the restoration unit 4 on the basis of the document obtained by the acquisition unit 2 and the document restored by the restoration unit 4. At this time, the learning unit 5b may learn the parameters of the restoration unit 4 by using the first evaluation value calculated from the degree of similarity of each document.

(Technical Effect)

Next, a technical effect obtained by the learning system 1 according to the third example embodiment will be described.

As described in FIG. 6, in the learning system 1 according to the third example embodiment, not only the generation unit 3 but also the restoration unit 4 is learned. In this way, restoration accuracy of the document is improved by learning the restoration unit. As a result, more appropriate documents are restored, and the learning of the generation unit 3 using the restored documents is performed more properly.

Fourth Example Embodiment

The learning system 1 according to a fourth example embodiment will be described with reference to FIG. 7 and FIG. 8. The fourth example embodiment is partially different from the first to third example embodiments only in the operation, and may be the same as the first to third example embodiments in the other parts. For this reason, a part that is different from each of the example embodiments described above will be described in detail below, and a description of other overlapping parts will be omitted as appropriate.

(Configuration of Acquisition Unit)

First, with reference to FIG. 7, a configuration of an acquisition unit of the learning system 1 according to the fourth example embodiment will be described. FIG. 7 is a block diagram illustrating the configuration of the acquisition unit in the learning system according to the fourth example embodiment.

Figure 7:
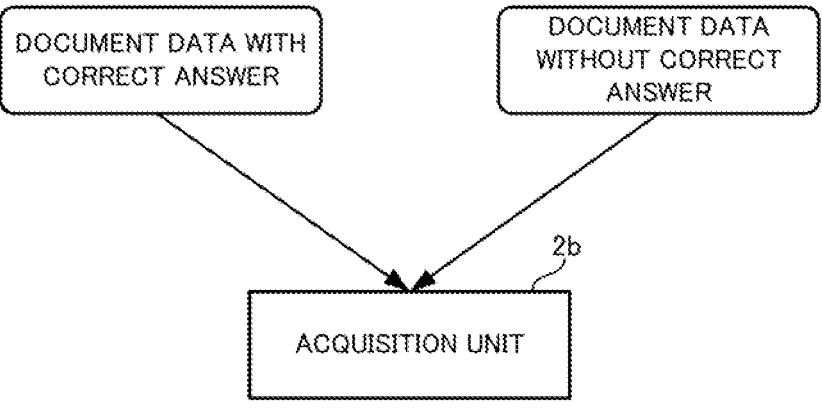
FIG. 7 is a block diagram illustrating a configuration of an acquisition unit in a learning system according to a fourth example embodiment.

As illustrated in FIG. 7, in the learning system 1 according to the fourth example embodiment, an acquisition unit 2b is configured to obtain two types of document data. The document data obtained by the acquisition unit 2b are: document data to which a correct answer label (or the key phrase as the correct answer) described in the first to third example embodiments is not added (hereinafter referred to as "first document data" as appropriate); and document data to which the correct answer label (or the key phrase as the correct answer) is added (hereinafter referred to as "second document data" as appropriate). The "correct answer label" here may be simply a label. Similarly, the "key phrase as the correct answer" may be simply a key phrase.

From the first document data and the second document data, as described in each of the example embodiments described above, the key phrase is generated by the generation unit 3. The method of calculating the evaluation value, however, is different between the key phrase generated from the first document data and the key phrase generated from the second document data.

(Calculation of Evaluation Value)

Next, the method of calculating the evaluation value in the learning system 1 according to the fifth example embodiment will be specifically described with reference to FIG. 8. FIG. 8 is a flowchart illustrating an operation of calculating the evaluation value in the learning system according to the third example embodiment.

Figure 8:
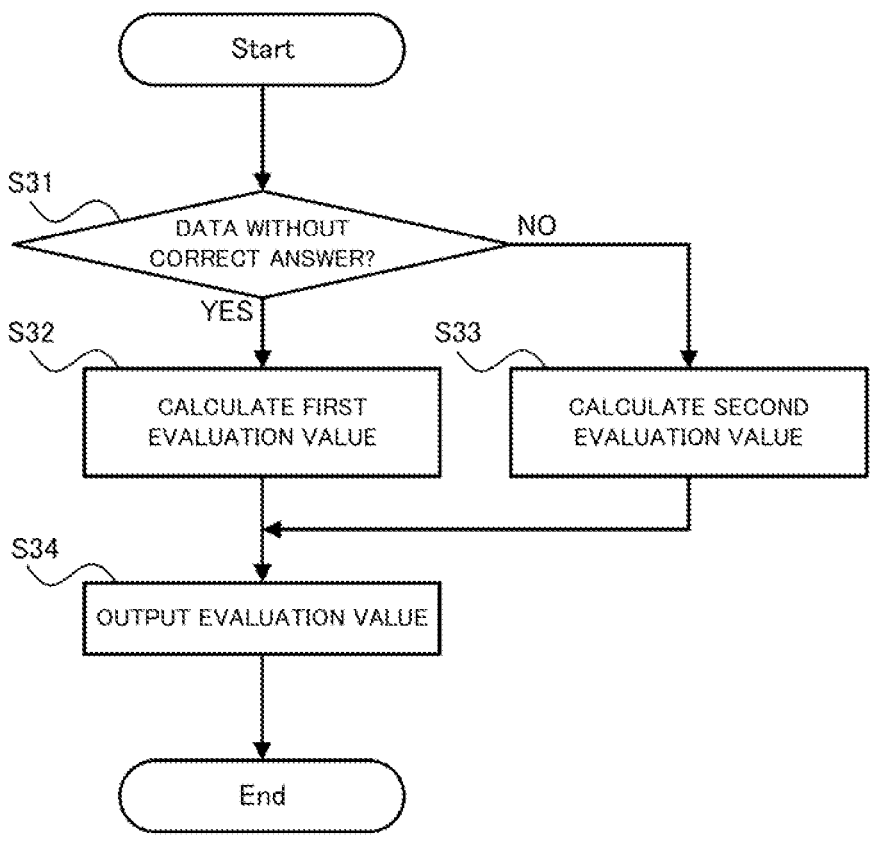
FIG. 8 is a flowchart illustrating an operation of calculating an evaluation value in the learning system according to the fourth example embodiment.

As illustrated in FIG. 8, first, the learning unit 5 in the learning system 1 according to the fourth example embodiment determines whether or not the original document from which the key phrases are generated, is data without the correct answer label (or the key phrase as the correct answer) (step S31). That is, the learning unit 5 determines whether the document data are the first document data or the second document data.

When the original document from which the key phrase are generated, is data without the correct answer label (or the key phrase as the correct answer) (step S31: YES), the learning unit 5 calculates the first evaluation value on the basis of the degree of similarity between the document obtained by the acquisition unit 2 and the document restored by the restoration unit 4 (step S32). That is, the learning unit 5 calculates the evaluation value in the same method as that in the first to third example embodiments. On the other hand, when the original document is data with the correct answer label (or the key phrase as the correct answer) (step S31: NO), the learning unit 5 calculates the second evaluation value on the basis of a rate of matching between the key phrases generated by the generation unit 3 and the key phrase as the correct label (or the key phrase as the correct answer) (step S33). For example, when the number of the generated key phrases is less than the number of the key phrases as the correct answer, a recall value may be used as the evaluated value, and when the number of generated key phrases is greater than the number of generated key phrases, an F1 score may be used as the evaluated value.

The learning unit 5 outputs the calculated evaluation value. At this time, the learning unit 5 may output a value obtained by adding the second evaluation value calculated with the correct answer label (or the key phrase as the correct answer) to the first evaluation value calculated without the correct answer label (or the key phrase as the correct answer), as an overall evaluation value. In that case, the second evaluation value with the correct answer label (or the key phrase as the correct answer) may be multiplied by a predetermined coefficient and then added to the first evaluation value.

Furthermore, the learning system 1 may output the key phrase and may accumulate the key phrase as the correct answer label (or a unit label). Specifically, first, the key phrase generated by the learning system 1 is outputted to the user. The user corrects the outputted key phrase (may not correct it if not necessary). The learning system then accumulates the corrected key phrase and the document data corresponding to the key phrase, as the training data. The accumulated training data may be used for re-learning of the learning system 1 or learning of another system, as the data without the correct answer label (or the key phrase as the correct answer).

(Technical Effect)

Next, a technical effect obtained by the learning system 1 according to the fourth example embodiment will be described.

As described in FIG. 7 and FIG. 8, in the learning system 1 according to the fourth example embodiment, the document data that include the key phrase as the correct answer and the document data that do not include the key phrase as the correct answer, are both used. In this way, it is possible to learn the generation unit 3 with high accuracy, even if there is a small amount of the document data including the key phrase as the correct answer, as compared with the learning using only these document data.

Fifth Example Embodiment

The learning system 1 according to a fifth example embodiment will be described with reference to FIG. 9. The fifth example embodiment is partially different from the first to fourth example embodiments only in the operation, and may be the same as the first example embodiment in the other parts. For this reason, a part that is different from each of the example embodiments described above will be described in detail below, and a description of other overlapping parts will be omitted as appropriate.

(Flow of Learning Operation)

First, a flow of the learning operation by the learning system 1 according to the fifth example embodiment will be described in detail with reference to FIG. 9. FIG. 9 is a flowchart illustrating the flow of the operation of the learning system according to the fifth example embodiment. In FIG. 9, the same steps as those illustrated in FIG. 4 carry the same reference numerals.

Figure 9:
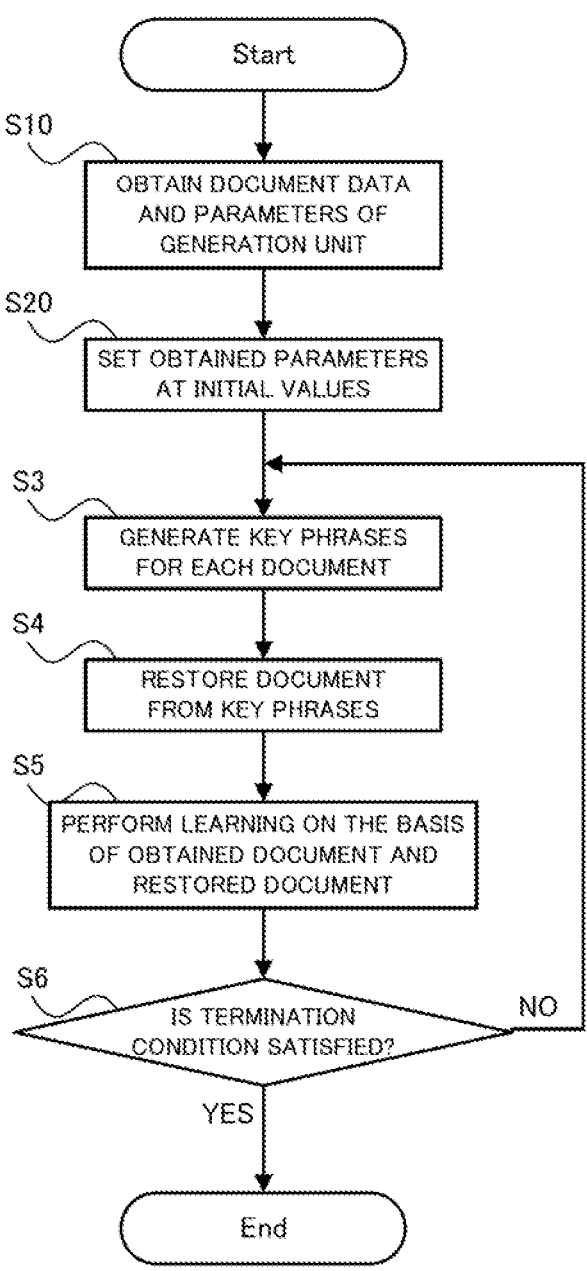
FIG. 9 is a flowchart illustrating a flow of operation of a learning system according to a fifth example embodiment.

As illustrated in FIG. 9, when the learning operation by the learning system 1 according to the fifth example embodiment is started, first, the acquisition unit 2 obtains the document data and the parameters of the generation unit 3 (i.e., the parameters used when generating the key phrases from the document) (step S10). The parameters of the generation unit 3 obtained by the acquisition unit 2 may be parameters learned in advance. A method of learning the parameters is not particularly limited. The parameters of the generation unit 3 obtained by the acquisition unit 2 may be parameters generated by the method disclosed in the Non-Patent Literature 1 or 2, for example.

Subsequently, the generation unit 3 sets the parameters obtained by the acquisition unit 2 at initial values (step S20). That is, in the generation unit 3, the learning is started in an initialized state by the parameters obtained by the acquisition unit 2. After the step S20, the same steps as those in the first example embodiment (i.e., the steps S3 to S6) will be performed, and a description thereof is thus omitted.

(Technical Effect)

Next, a technical effect obtained by the learning system 1 according to the fifth example embodiment will be described.

As described in FIG. 9, in the learning system 1 according to the fifth example embodiment, the parameters of the generation unit 3 are obtained in addition to the document data. In this way, it is possible to start the learning of the generation unit 3 in an appropriate state, on the basis of the obtained parameters. Furthermore, the learning system 1 according to the fifth example embodiment does not require the key phrase as the correct answer in the learning process, as in the above-described example embodiments. Consequently, it is possible to adapt the obtained parameters to domains of the inputted document data, without using the manually added key phrase corresponding to the document referred to as the training data. Thus, it is possible to learn the high-precision generation unit 3 in which domain adaptation is performed in a generation unit that is highly accurate in another domain.

A processing method in which a program for allowing the configuration in each of the example embodiments to operate to realize the functions of each example embodiment is recorded on a recording medium, and in which the program recorded on the recording medium is read as a code and executed on a computer, is also included in the scope of each of the example embodiments. That is, a computer-readable recording medium is also included in the range of each of the example embodiments. Not only the recording medium on which the above-described program is recorded, but also the program itself is also included in each example embodiment.

The recording medium to use may be, for example, a floppy disk (registered trademark), a hard disk, an optical disk, a magneto-optical disk, a CD-ROM, a magnetic tape, a nonvolatile memory card, or a ROM. Furthermore, not only the program that is recorded on the recording medium and executes processing alone, but also the program that operates on an OS and executes processing in cooperation with the functions of expansion boards and another software, is also included in the scope of each of the example embodiments. In addition, the program itself may be stored in a server, and a part or all of the program may be downloaded from the server to a user terminal. The program may be provided to the user in a form of SaaS (Software as a Service), for example.

Supplementary Notes

The example embodiments described above may be further described as, but not limited to, the following Supplementary Notes.

Supplementary Note 1

A learning system according to Supplementary Note 1 is a learning system including: an acquisition unit that obtains document data; a generation unit that generates a key phrase from the document data; a restoration unit that restores the document data from the generated key phrase; and a learning unit that learns parameters of the generation unit on the basis of the document data and the restored document data.

Supplementary Note 1

A learning system according to Supplementary Note 2 is the learning system according to Supplementary Note 1, wherein the learning unit learns the parameters on the basis of a first evaluation value calculated by a degree of similarity between the document data and the restored document data.

Supplementary Note 3

A learning system according to Supplementary Note 3 is the learning system according to Supplementary Note 2, wherein the learning unit calculates the degree of similarity by using a predetermined language model, and the first evaluation value is a value indicating a degree of restoration of the document data from the key phrase.

Supplementary Note 4

A learning system according to Supplementary Note 4 is the learning system according to any one of Supplementary Notes 1 to 3, wherein the learning unit learns parameters of the restoration unit on the basis of the document data and the restored document data.

Supplementary Note 5

A learning system according to Supplementary Note 5 is the learning system according to any one of Supplementary Notes 1 to 4, wherein the acquisition unit obtains first document data that do not include the key phrase and second document data that include a predetermined key phrase.

Supplementary Note 6

A learning system according to Supplementary Note 6 is the learning system according to Supplementary Note 5, wherein the learning unit calculates a first evaluation value on the basis of a degree of similarity between the document data and the restored document data, for the first document data, and calculates a second evaluation value on the basis of a degree of matching between the key phrase generated by the generation unit and the predetermined key phrase, for the second document data.

Supplementary Note 7

A learning system according to Supplementary Note 7 is the learning system according to any one of Supplementary Notes 1 to 6, wherein the acquisition unit obtains the parameters of the generation unit, in addition to the document data.

Supplementary Note 8

A learning method according to Supplementary Note 8 is a learning method including: obtaining document data; generating a key phrase from the document data by using a generation unit; restoring the document data from the generated key phrase; and learning parameters of the generation unit on the basis of the document data and the restored document data.

Supplementary Note 9

A computer program according to Supplementary Note 9 is a computer program that allows at least one computer to execute a learning method, the learning method including: obtaining document data; generating a key phrase from the document data by using a generation unit; restoring the document data from the generated key phrase; and learning parameters of the generation unit on the basis of the document data and the restored document data.

Supplementary Note 10

A computer program according to Supplementary Note 10 is a non-transitory recording medium on which a computer program that allows at least one computer to execute a learning method is recorded, the learning method including: obtaining document data; generating a key phrase from the document data by using a generation unit; restoring the document data from the generated key phrase; and learning parameters of the generation unit on the basis of the document data and the restored document data.

Supplementary Note 11

A learning apparatus according to Supplementary Note 11 is a learning apparatus including: an acquisition unit that obtains document data; a generation unit that generates a key phrase from the document data; a restoration unit that restores the document data from the generated key phrase; and a learning unit that learns parameters of the generation unit on the basis of the document data and the restored document data.

This disclosure is not limited to the above-described examples and is allowed to be changed, if desired, without departing from the essence or spirit of the invention which can be read from the claims and the entire specification. A learning system, a learning method, a computer program, and a recording medium with such changes, are also included in the technical concepts of this disclosure.

DESCRIPTION OF REFERENCE NUMERALS

1 Learning system
2 Acquisition unit
3 Generation unit
4 Restoration unit
5 Learning unit

What is claimed is:

1. A learning system comprising:
at least one memory that is configured to store instructions; and
at least one processor that is configured to execute the instructions to:
obtain document data;
generate a key phrase from the document data;
restore the document data from the generated key phrase;
calculate a degree of similarity between the document data and the restored document data by using a language model that outputs a probability for an inputted word string;
calculate a first evaluation value on the basis of the calculated degree of similarity, the first evaluation value being a value indicating a degree of restoration of the document data from the key phrase;
learn parameters of a generation unit which generates the key phrase on the basis of the document data and the restored document data;
learn the parameters on the basis of a first evaluation value calculated by a degree of similarity between the document data and the restored document data;
update parameters of the generation unit to maximize the first evaluation value; and
repeatedly perform the generating, the restoring, the calculating, and the updating until a predetermined termination condition is satisfied.

2. The learning system according to claim 1, wherein: the at least one processor is configured to execute the instructions to calculate the degree of similarity by using a predetermined language model, and the first evaluation value is a value indicating a degree of restoration of the document data from the key phrase.

3. The learning system according to claim 1, wherein the at least one processor is configured to execute the instructions to learn parameters of a restoration unit which restores the document data from the key phrase on the basis of the document data and the restored document data.

4. The learning system according to claim 1, wherein the at least one processor is configured to execute the instructions to obtain first document data that do not include the key phrase and second document data that include a predetermined key phrase.

5. The learning system according to claim 4, wherein the at least one processor is configured to execute the instructions to:
calculate the first evaluation value on the basis of a degree of similarity between the document data and the restored document data, for the first document data, and
calculate a second evaluation value on the basis of a degree of matching between the key phrase generated by the generation unit and the predetermined key phrase, for the second document data.

6. The learning system according to claim 1, wherein the at least one processor is configured to execute the instructions to obtain the parameters of a generation unit which generates the key phrase, in addition to the document data.

7. A learning method, performed by at least one processor and comprising:
obtaining document data;
generating a key phrase from the document data by using a generation unit;
restoring the document data from the generated key phrase;
calculating a degree of similarity between the document data and the restored document data by using a language model that outputs a probability for an inputted word string;
calculating a first evaluation value on the basis of the calculated degree of similarity, the first evaluation value being a value indicating a degree of restoration of the document data from the key phrase;
learning parameters of a generation unit which generates the key phrase on the basis of the document data and the restored document data;
learning the parameters on the basis of a first evaluation value calculated by a degree of similarity between the document data and the restored document data;
updating parameters of the generation unit to maximize the first evaluation value; and
repeatedly performing the generating, the restoring, the calculating, and the updating until a predetermined termination condition is satisfied.

8. A non-transitory recording medium on which a computer program that when executed by at least one processor, causes the at least one processor to:
obtain document data;
generate a key phrase from the document data by using a generation unit;
restore the document data from the generated key phrase;
calculate a degree of similarity between the document data and the restored document data by using a language model that outputs a probability for an inputted word string;
calculate a first evaluation value on the basis of the calculated degree of similarity, the first evaluation value being a value indicating a degree of restoration of the document data from the key phrase;
learn parameters of a generation unit which generates the key phrase on the basis of the document data and the restored document data;
learn the parameters on the basis of a first evaluation value calculated by a degree of similarity between the document data and the restored document data;
update parameters of the generation unit to maximize the first evaluation value; and
repeatedly perform the generating, the restoring, the calculating, and the updating until a predetermined termination condition is satisfied.

* * * * *